(12) United States Patent
Watanabe

(10) Patent No.: US 8,540,221 B2
(45) Date of Patent: Sep. 24, 2013

(54) AIR SPRING

(75) Inventor: Isao Watanabe, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 380 days.

(21) Appl. No.: 13/063,848

(22) PCT Filed: Aug. 27, 2009

(86) PCT No.: PCT/JP2009/064978
§ 371 (c)(1),
(2), (4) Date: Mar. 14, 2011

(87) PCT Pub. No.: WO2010/032597
PCT Pub. Date: Mar. 25, 2010

(65) Prior Publication Data
US 2011/0169203 A1    Jul. 14, 2011

(30) Foreign Application Priority Data
Sep. 16, 2008   (JP) .................................. 2008-236627

(51) Int. Cl.
*F16F 9/04*      (2006.01)

(52) U.S. Cl.
USPC ..................................... 267/64.24; 267/64.27

(58) Field of Classification Search
USPC .................. 267/64.11–64.27, 118, 119, 120, 267/124, 130
See application file for complete search history.

(56) References Cited

U.S. PATENT DOCUMENTS

| 3,897,941 | A | * | 8/1975 | Hirtreiter et al. | 267/64.24 |
| 4,378,935 | A | * | 4/1983 | Brown et al. | 267/64.27 |
| 5,346,187 | A | * | 9/1994 | Drescher | 267/64.11 |
| 5,566,929 | A | * | 10/1996 | Thurow | 267/64.24 |
| 2004/0124571 | A1 | * | 7/2004 | Gold et al. | 267/124 |

FOREIGN PATENT DOCUMENTS

| JP | 36-18305 Y1 | 7/1961 |
| JP | 36-30314 Y1 | 11/1961 |
| JP | 10-132007 A | 5/1998 |
| JP | 2000-088029 A | 3/2000 |
| JP | 2000-088030 A | 3/2000 |
| JP | 2004-278583 A | 10/2004 |

OTHER PUBLICATIONS

International Search Report of PCT/JP2009/064978 dated Oct. 6, 2009.

* cited by examiner

*Primary Examiner* — Christopher Schwartz
(74) *Attorney, Agent, or Firm* — Sughrue Mion, PLLC

(57) ABSTRACT

The opposite side of a connecting intermediate section 32A of a diaphragm 32 to that of a first end section 32B extends from the connecting intermediate section 32A as a second end section 32C side that folds back towards the tube outside in an inside out reversed state. The diameter of the second end portion 32C is set larger than the diameter of the connecting intermediate section 32A. The second end portion 32C is fitted over an end on a chamber member 22 side of an outer tube member 60 and fixed with press contact against the outer tube member 60 by a band 72.

4 Claims, 4 Drawing Sheets

AIR SPRING

CROSS REFERENCE TO RELATED APPLICATION

This application is a National Stage of International Application No. PCT/JP2009/064978 filed Aug. 27, 2009, claiming priority based on Japanese Patent Application No. 2008-236627 filed Sep. 16, 2008, the contents of all of which are incorporated herein by reference in their entirety.

TECHNICAL FIELD

The present invention relates to an air spring utilizing air pressure to generate an elastic reaction force in response to an input load, and supporting the input load with the reaction force.

RELATED ART

Air springs for vehicle suspension applications and the like are known such as, for example, as described in Japanese Patent Application Laid-Open (JP-A) No. 2004-278583. The air spring described in JP-A No. 2004-278583 is equipped with a chamber, a piston and a diaphragm. The diaphragm is formed in a substantially circular cylindrical shaped, with an intermediate section that is in an inside out reversed state, with a first end section and other end section of the diaphragm connected to the chamber and the piston, respectively, so as to form a chamber enclosure on the inside and be covered by an outer tube of circular cylindrical shape.

The air spring configured as described above is applied to a vehicle suspension or the like. When applied to a vehicle, the chamber is fixed to the vehicle body side, and the piston is fixed so as to be connected to a suspension arm, such that the diaphragm is disposed between the vehicle body and the suspension arm in an extendable and compressible state along a direction of swing. Accordingly, when the suspension arm swings towards the vehicle body side (the bound direction) due to load from the road surface side, air within the chamber enclosure inside the diaphragm is compressed, raising the air pressure, and load input from the road surface side through the suspension arm is supported by the air pressure. During such action, the position the suspension arm adopts when in the neutral position is adjustable by adjusting the air pressure filled in the chamber enclosure.

In the air spring of JP-A No. 2004-278583, an outer tube is provided, and the outer periphery of the diaphragm is fixed to the inner wall of the outer tube. Consequently, the outer tube is more movable with respect to the chamber compared to cases in which the outer tube is fixed to a chamber, suppressing the outer tube and the piston from impinging against each other, and suppressing extreme compression occurring to the inside out reversed section of the diaphragm due to being squashed between the outer tube and the piston. However, in an air spring of such a configuration, since the diaphragm between the end section of the outer tube on the chamber side and the chamber is exposed, this section is susceptible to entry and depositing occurring of foreign objects, such as dirt, stones and the like. There is hence a need to prevent penetration and depositing of foreign objects, and to maintain the durability of the diaphragm.

DISCLOSURE OF THE INVENTION

Problem to be Solved by the Invention

The present invention is made in consideration of the above circumstances and an object thereof is to provide an air spring capable of maintaining the durability of a diaphragm by a simple structure.

Method of Solving the Problem

In order to achieve the above objective, an air spring of a first aspect of the present invention is an air spring for disposing between a first moving body and a second moving body that move relative to each other. The air spring includes: a chamber member attached at the first moving body side; a piston member attached at the second moving body side; an outer tube member of cylindrical shape of larger diameter than that of the piston member; and a diaphragm of cylindrical shape of larger diameter than that of the piston member, inserted inside the tube of the outer tube member, connected to the chamber member and the piston member such that a chamber enclosure is configured inside and with the external periphery of the diaphragm attached to an intermediate section of an inner wall at the chamber member side of the outer tube member. A connecting intermediate section of the diaphragm on the chamber member side is connected to the chamber member, and a first end section disposed on the piston member side of the diaphragm is connected to the piston member. The first end section side of the diaphragm is folded back towards the tube inside in an inside out reversed state. A second end section side of the diaphragm extends from the connecting intermediate section and is folded back towards the tube outside in an inside out reversed state. The second end section of the diaphragm is connected to the outer periphery of the outer tube member.

In the air spring of the above described configuration, the second end section side of the diaphragm extends from the connecting intermediate section connected to the chamber member and is folded back towards the tube outside in an inside out reversed state. Consequently, the section of the diaphragm configuring the chamber enclosure (between the outer tube member and the chamber member) is not externally exposed, and foreign objects can be prevented from penetrating in from outside and being deposited. Accordingly, the durability of the diaphragm can be maintained.

Furthermore, according to the configuration described above, since there is a diaphragm section extending out and covering the section of the diaphragm configuring the chamber enclosure, the number of components can be reduced in comparison to cases where covering is achieved by a separate member.

In an air spring of a second aspect of the present invention, the second end section of the diaphragm is set with a larger diameter than the connecting intermediate section.

Accordingly, by setting the second end section with a larger diameter than that of the connecting intermediate section, the second end section side can be readily folded over towards the tube outside.

In an air spring of a third aspect of the present invention, reinforcement material is incorporated in the diaphragm spanning from the connecting intermediate section to the first end section.

According to the above configuration, the diaphragm can be reinforced from the connecting intermediate section to the first end section, and folding over can be facilitated from the connecting intermediate section to the second end section.

Effects of the Invention

According to the air spring of the present invention as explained above, the durability of the diaphragm can be maintained with a simple structure.

BEST MODE OF IMPLEMENTING THE INVENTION

Explanation now follows regarding an air spring according to exemplary embodiments of the present invention, with reference to the drawings.

Figure 1:
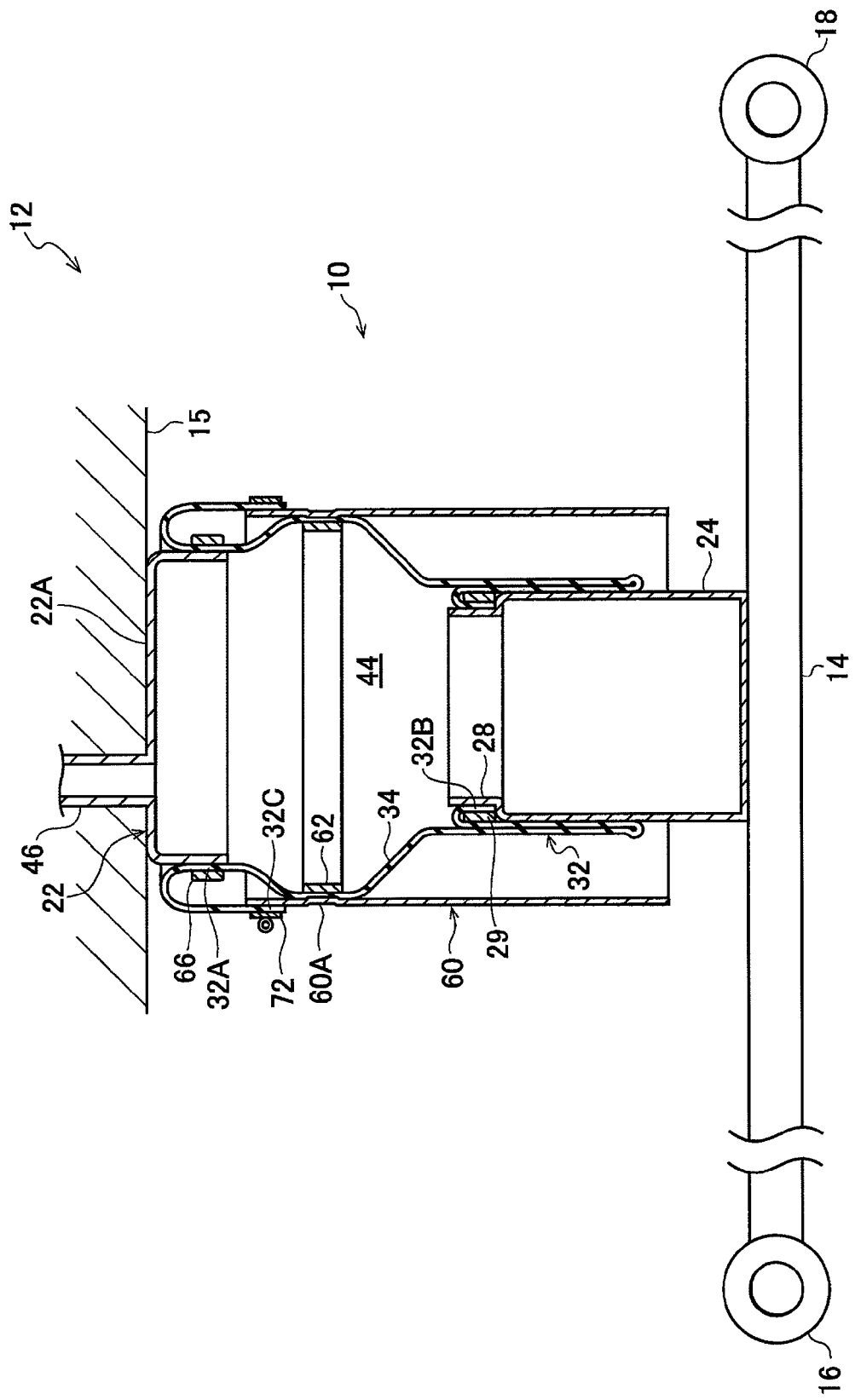
FIG. 1 is a cross-section shown from the side of a configuration of a suspension applied with an air spring according to an exemplary embodiment of the present invention, illustrating a state in which internal pressure has not been filled in the air spring.
Figure 2:
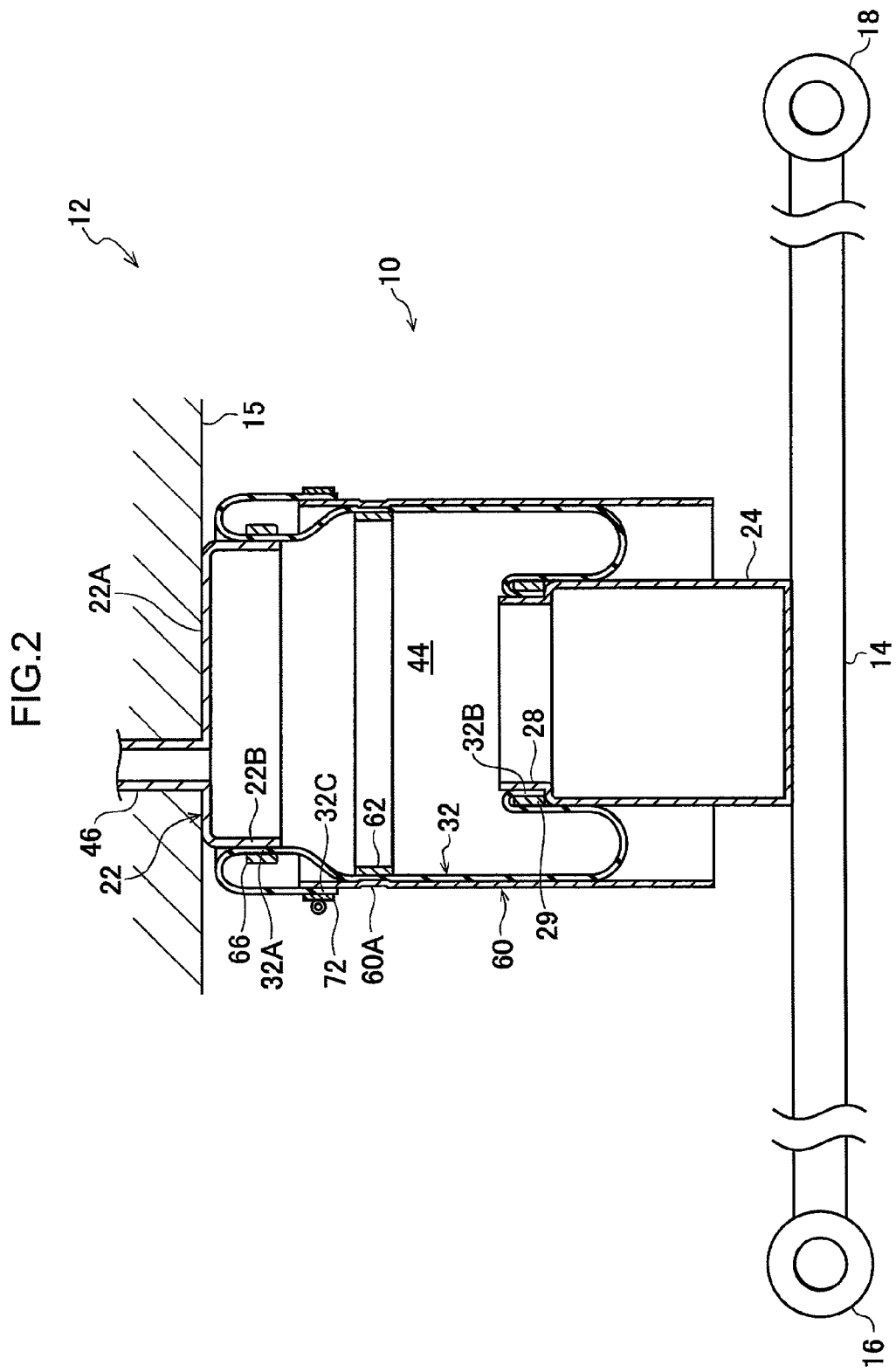
FIG. 2 is a cross-section shown from the side of a configuration of a suspension applied with an air spring according to an exemplary embodiment of the present invention, illustrating a state in which internal pressure has been filled in the air spring and a suspension arm is in its neutral position.

FIG. 1 and FIG. 2 schematically illustrate a suspension applied with an air spring according to an exemplary embodiment of the present invention. The air spring of the present exemplary embodiment is disposed between a vehicle body serving as a first moving body and a suspension arm serving as a second moving body. FIG. 1 illustrates a state in which the internal pressure of the air spring has not be filled, and FIG. 2 illustrates a state in which the internal pressure of the air spring has been filled.

As shown in FIG. 1 and FIG. 2, a suspension 12 includes an air spring 10 formed overall in a drum shape, and a suspension arm 14 formed in a beam shape. Circular cylindrical shaped bush holders 16, 18 are disposed at the length direction base end and leading end of the suspension arm 14. The suspension arm 14 is disposed in a neutral position in FIG. 1 and FIG. 2.

The base end side bush holder 16 of the suspension arm 14 is connected through a rubber bush (not shown in the drawings) to a vehicle body 15 side so as to be able to swing, the leading end side bush holder 18 of the suspension arm 14 is connected to a wheel hub (not shown in the drawings) side through a rubber bush so as to be rotatable. The suspension arm 14 is thereby supported so as to be able to swing in a vehicle body 15 top-bottom direction about the base end side bush holder 16.

The air spring 10 includes a chamber member 22, a piston member 24, a diaphragm 32 and an outer tube member 60.

The piston member 24 is attached to the suspension arm 14 side, and the chamber member 22 is attached to the vehicle body 15 side.

The piston member 24 is formed with a bottomed substantially circular cylindrical shape, with a circular cylindrical shaped connection receiving portion 28 integrally formed at a top edge portion of the piston member 24 and having a reduced internal and external diameter with respect to the bottom edge portion of the piston member 24. The piston member 24 is fixed to the suspension arm 14 at the bottom face side of the bottom plate of the piston member 24.

The chamber member 22 is fixed to the vehicle body 15 such that a bottomed section 22A, formed in a bottomed circular cylindrical shape, is disposed as the top face of the chamber member 22. A circular cylindrical shaped connection receiving portion 22B is formed by bending the chamber member 22 around so as to project out downwards from the outer peripheral edge of the bottomed section 22A.

The diaphragm 32 is of a thin circular cylindrical shape of larger diameter than that of the piston member 24, and has a connecting intermediate section 32A connected to the connection receiving portion 22B of the chamber member 22, and a first end section 32B connected to the connection receiving portion 28 of the piston member 24. The diaphragm 32 is formed from a rubber membrane, and is configured incorporating reinforcement material 33 spanning from the connecting intermediate section 32A to the first end section 32B. The durability can be raised by configuring with the reinforcement material 33 incorporated. Nylon can be employed as the reinforcement material 33.

When the diaphragm 32 is in a state not filled with internal pressure, as shown in FIG. 1, a tapered section 34 is configured at an intermediate section of the diaphragm 32, with decreasing diameter towards the piston member 24 side. The first end section 32B of the diaphragm 32 is set with substantially the same diameter as the small diameter side of the tapered section 34. The diaphragm 32 is folded back on itself such that the first end section 32B enters inside the tube of the diaphragm 32, thereby reversing the outer peripheral face and the inner peripheral face of the diaphragm 32.

The first end section 32B of the diaphragm 32 is fitted over the outside of the connection receiving portion 28, so as to cover the outer periphery of the connection receiving portion 28. A bottom side crimping ring 29 is wound over the outer peripheral side of the first end section 32B. The bottom side crimping ring 29 tightens towards the inner peripheral side, making the first end section 32B press contact the outer peripheral face of the connection receiving portion 28 around the entire periphery, such that the first end section 32B is connected and fixed to the connection receiving portion 28 in an air tight state. The outer tube member 60 is formed in a circular cylindrical shape and is set with a larger diameter than the internal diameter of the diaphragm 32. The outer tube member 60 is disposed so as to cover the outer peripheral side of the diaphragm 32, and the inner tube wall at an intermediate section 60A on the chamber member 22 side is fixed to the outer peripheral side of the diaphragm 32. Fixing here is accomplished by disposing an annular ring 62 inside the diaphragm 32, and nipping the diaphragm 32 between the annular ring 62 and the outer tube member 60 by tightening the outer tube member 60 from the outside towards the radial inside. The outer tube member 60 is made of metal and prevents expanding of the diaphragm 32 towards the radial direction outside. Due to the outer tube member 60, deformation of the diaphragm 32 with the passage of time can be suppressed. Impinging of the diaphragm 32 against other components can also be prevented thereby.

Figure 3:
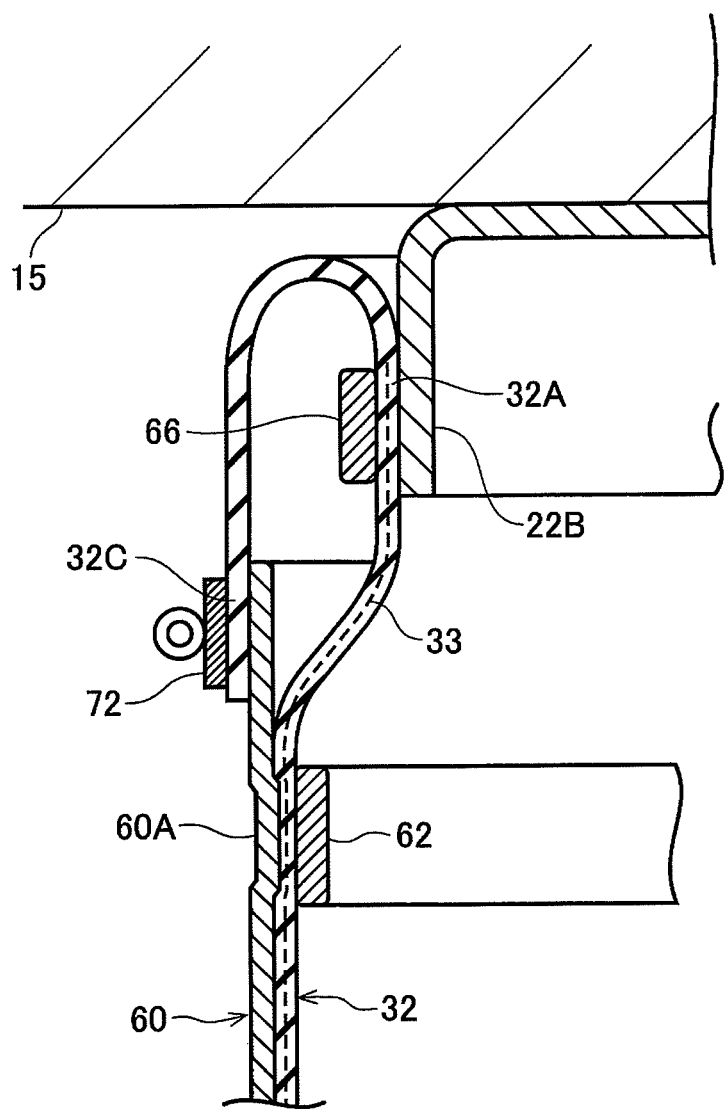
FIG. 3 is an enlarged cross-section of an attachment portion of a cover member of an air spring according to an exemplary embodiment of the present invention.

The connecting intermediate section 32A of the diaphragm 32 is, as shown in FIG. 3, fitted over the outside of the connection receiving portion 22B of the chamber member 22. An upper side crimping ring 66 is wound around the outer peripheral side of the connecting intermediate section 32A. The upper side crimping ring 66 fastens the connecting intermediate section 32A towards the radial direction inside so as to make the connecting intermediate section 32A press contact with the outer peripheral face of the connection receiving portion 22B around the entire periphery, and connecting and fixing the connecting intermediate section 32A to the connection receiving portion 22B in an air tight state. A substantially circular column shaped chamber enclosure 44 is configured inside the diaphragm 32 tube.

As shown in FIG. 1 and FIG. 2, the chamber member 22 is fixed in a position on the vehicle body 15 side facing the piston member 24. The air spring 10 is accordingly installed between the suspension arm 14 and the vehicle body 15. One end of a high pressure tube 46 is connected to an apex plate portion of the chamber member 22. The other end of the high pressure tube 46 is connected to a compressed air supply source (not shown in the drawings), such as an air pump, accumulator or the like, mounted on the vehicle body 15 side, thereby communicating the compressed air supply source with the inside of the chamber enclosure 44. The compressed air supply source supplies compressed air through the high pressure tube 46 on into the chamber enclosure 44, according to the state of travel and loading of the vehicle.

The opposite side of the connecting intermediate section 32A of the diaphragm 32 to that of the first end section 32B is extended from the connecting intermediate section 32A as a second end section 32C that folds back to a tube outside so as to be in an inside out reversed state. The diameter of the second end portion 32C is set larger than the diameter of the connecting intermediate section 32A. Hence, by setting the diameter of the second end section 32C a larger diameter than the diameter of the connecting intermediate section 32A, inside out reversal can be easily accomplished. The second end section 32 is fitted over the outside of the chamber member 22 side end portion of the outer tube member 60 and fixed in press contact to the outer tube member 60 by a band 72.

By attaching the second end section 32C of the diaphragm 32 in the manner described above, the portion of the diaphragm 32 configuring the chamber enclosure 44 (the portion from the portion corresponding to the intermediate section 60A up to the connecting intermediate section 32A) is covered by the portion extending from the connecting intermediate section 32A. The portion of the diaphragm 32 configuring the chamber enclosure 44 on the chamber member 22 side is thereby not externally exposed, and is protected from foreign objects such as dust particles or the like.

Explanation now follows regarding operation of the air spring 10 according to the present exemplary embodiment configured as described above.

Figure 4:
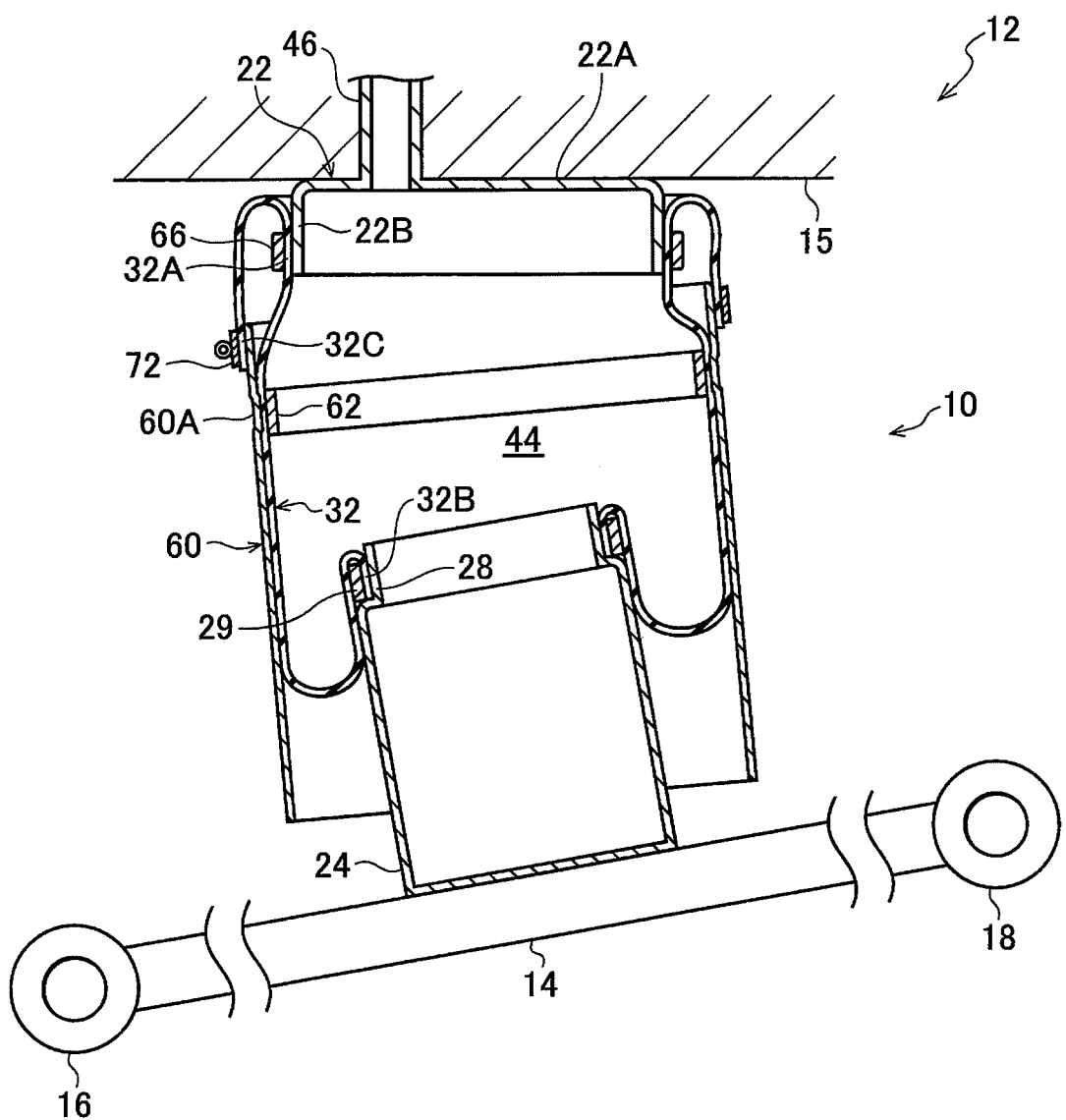
FIG. 4 is a cross-section shown from the side of an air spring according to an exemplary embodiment of the present invention when a suspension arm has swung in a bound direction.

The air spring 10, by installation between the vehicle body 15 and the suspension arm 14, imparts spring reaction force to the suspension arm 14 in accordance with the internal pressure inside the chamber enclosure 44. Load input to the suspension arm 14 from the road surface side is supported by this spring reaction force. Namely, as shown in FIG. 4, when the suspension arm 14 swings towards the vehicle body side (bound direction X) due to load from the road surface side, air inside the chamber enclosure 44 is compressed due to the piston member 24 and the internal pressure rises, with the load input from the road surface side through the suspension arm 14 supported by the air pressure.

When this occurs, due to reaction force of the diaphragm 32, as the cylindrical axis of the outer tube member 60 tilts with respect to the axial center of the chamber member 22 the gap between the outer tube member 60 and the piston member 24 widens. Reduction in durability of the diaphragm 32, caused by extreme compression due to being squashed between the outer tube member 60 and the piston member 24, can thereby be suppressed.

Furthermore, in the present exemplary embodiment, since an end portion of the diaphragm 32 folds back on itself between the free end of the end portion of the outer tube member 60 on the chamber member 22 side and the chamber member 22, so as to cover the portion of the diaphragm 32 configuring the chamber enclosure 44, the diaphragm 32 is protected from foreign objects such as dust particles and the like, and a reduction in durability can be suppressed.

Furthermore, since in the present exemplary embodiment the diaphragm 32 extends out from the connecting intermediate section 32A to cover the portion of the diaphragm 32 configuring the chamber enclosure 44, the number of components can be reduced in comparison to cases in which covering is performed by a separate member.

The invention claimed is:

1. An air spring for disposing between a first moving body and a second moving body that move relative to each other, the air spring comprising:
   a chamber member attached at the first moving body side;
   a piston member attached at the second moving body side;
   an outer tube member of cylindrical shape of larger diameter than that of the piston member; and
   a diaphragm of cylindrical shape of larger diameter than that of the piston member, inserted inside the tube of the outer tube member, connected to the chamber member and the piston member such that a chamber enclosure is configured inside and with the external periphery of the diaphragm attached to an intermediate section of an inner wall at the chamber member side of the outer tube member, wherein,
   a connecting intermediate section of the diaphragm on the chamber member side is connected to the chamber member, and a first end section disposed on the piston member side of the diaphragm is connected to the piston member,
   the first end section side of the diaphragm is folded back towards the tube inside in an inside out reversed state,
   a second end section side of the diaphragm extends from the connecting intermediate section and is folded back towards the tube outside in an inside out reversed state, and
   the second end section of the diaphragm is connected to the outer periphery of the outer tube member.

2. The air spring of claim 1, wherein the second end section of the diaphragm is set with a larger diameter than the connecting intermediate section.

3. The air spring of claim 2, wherein reinforcement material is incorporated in the diaphragm spanning from the connecting intermediate section to the first end section.

4. The air spring of claim 1, wherein reinforcement material is incorporated in the diaphragm spanning from the connecting intermediate section to the first end section.

* * * * *